(12) United States Patent
Chastain

(10) Patent No.: US 9,912,488 B2
(45) Date of Patent: Mar. 6, 2018

(54) SYSTEM AND APPARATUS FOR PROVIDING SUBSCRIBER MANAGEMENT TO SUPPORT COMMUNICATIONS

(75) Inventor: Walter Cooper Chastain, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 799 days.

(21) Appl. No.: 13/471,855

(22) Filed: May 15, 2012

(65) Prior Publication Data

US 2013/0311630 A1    Nov. 21, 2013

(51) Int. Cl.
  *G06F 15/173*  (2006.01)
  *H04L 12/14*   (2006.01)
  *H04L 29/12*   (2006.01)

(52) U.S. Cl.
  CPC ...... *H04L 12/1407* (2013.01); *H04L 61/1588* (2013.01)

(58) Field of Classification Search
  CPC ............. H04L 41/0213; H04L 12/1407; H04L 61/1588
  USPC ........................................................ 709/223
  See application file for complete search history.

(56) References Cited

U.S. PATENT DOCUMENTS

| | | | |
|---|---|---|---|
| 8,613,073 B2* | 12/2013 | McCann et al. ................ | 726/13 |
| 2006/0077925 A1* | 4/2006 | Rune ............................ | 370/328 |
| 2006/0077965 A1 | 4/2006 | Garcia-Martin et al. | |
| 2006/0271693 A1* | 11/2006 | Thiebaut et al. ............. | 709/229 |
| 2007/0143834 A1 | 6/2007 | Leinonen et al. | |
| 2007/0190990 A1 | 8/2007 | Yin | |
| 2007/0213051 A1* | 9/2007 | Durecu et al. ............. | 455/435.1 |
| 2008/0133762 A1* | 6/2008 | Edge et al. .................... | 709/228 |
| 2010/0039930 A1 | 2/2010 | Liang | |
| 2010/0167734 A1 | 7/2010 | Jones et al. | |
| 2010/0182997 A1 | 7/2010 | Yang et al. | |
| 2010/0299451 A1 | 11/2010 | Yigang et al. | |
| 2010/0311392 A1* | 12/2010 | Stenfelt et al. ............... | 455/411 |
| 2011/0066530 A1 | 3/2011 | Cai | |
| 2011/0083014 A1 | 4/2011 | Lim | |
| 2011/0208628 A1 | 8/2011 | Foottit | |
| 2011/0225281 A1 | 9/2011 | Riley | |
| 2012/0030017 A1 | 2/2012 | Jones et al. | |

(Continued)

OTHER PUBLICATIONS

3GPP, "3rd Generation Partnership Project; Technical Specification Group Core Network and Terminals; IP Multimedia (IM) Subsystem Cx and Dx interfaces; Signalling flows and message contents (Release 9)", 3GPP TS 29.228 V9.1.0 (Mar. 2010).

(Continued)

*Primary Examiner* — Philip Chea
*Assistant Examiner* — Robert B McAdams
(74) *Attorney, Agent, or Firm* — Guntin & Gust, PLC; Andrew Gust

(57) ABSTRACT

A system that incorporates teachings of the present disclosure may include, for example, utilizing a first diameter agent function to route messages between network elements that provide subscriber management for a communication session, utilizing the first agent function to maintain transaction state during the communication session without maintaining session state, and utilizing the first server to selectively adjust routing information for the messages without adjusting non-routing information for the messages. Other embodiments are disclosed.

20 Claims, 15 Drawing Sheets

(56) References Cited

U.S. PATENT DOCUMENTS

| | | |
|---|---|---|
| 2012/0158872 A1 | 6/2012 | McNamee et al. |
| 2012/0158994 A1 | 6/2012 | McNamee et al. |
| 2012/0221899 A1* | 8/2012 | Cervenak et al. .............. 714/48 |
| 2013/0084826 A1 | 4/2013 | Mo et al. |

OTHER PUBLICATIONS

3GPP, "3rd Generation Partnership Project; Technical Specification Group Core Network and Terminals; IP Multimedia (IM) Subsystem Sh interface; Signalling flows and message contents (Release 9)", 3GPP TS 29.328 V9.2.0 (Jun. 2010).

3GPP, "3rd Generation Partnership Project; Technical Specification Group Core Network and Terminals; Sh Interface based on the Diameter protocol; Protocol details (Release 9)", 3GPP TS 29.329 V9.2.0 (Jun. 2010).

3GPP, "3rd Generation Partnership Project; Technical Specification Group Core Network; Cx and Dx interfaces based on the Diameter protocol; Protocol details (Release 5)", 3GPP TS 29.229 V5.13.0 (Sep. 2007).

Nokia, "NAF-BSF (D interface) protocol", 3GPP TSG SA WG3 Security—S3#28, Berlin, Germany, May 6-9, 2003.

Rosenberg, "Caller Preferences for the Session Initiation Protocol (SIP)", Cisco Systems, Aug. 2004.

Rosenberg, "Indicating User Agent Capabilities in the Session Initiation Protocol (SIP)", Cisco Systems, Aug. 2004.

Rosenberg, "Obtaining and Using Globally Routable User Agent URIs (GRUUs) in the Session Initiation Protocol (SIP)", Cisco Systems, Network Working Group, Oct. 2009.

* cited by examiner

100

200

400

300

| HSS Relay Zone | | |
|---|---|---|
| Interface | Node A | Node B |
| S6a | Mobile Management Entity | Common Network Repository |
| S6d | Serving GPRS Support Node | Common Network Repository |
| SLh | Gateway Mobile Location Centre | Common Network Repository |
| SLg | Gateway Mobile Location Centre | Mobile Management Entity |
| Sh | Service Centralization & Continuity Application Server | Common Network Repository |
| Sh | Application Server | Common Network Repository |
| Cx/Dx | Interrogating-/Serving- Call Session Control Function | Common Network Repository |
| Zh | Bootstrapping Server Function | Common Network Repository |

| PCC Routing Zone | | |
|---|---|---|
| Interface | Node A | Node B |
| Gx | Policy Control Enforcement Point | Policy Control Resource Function |
| Gy/Ro | Policy Control Enforcement Point / Application Server | Online Charging System |
| Gz/Rf | Policy Control Enforcement Point / Charging Trigger Function | Charging Data Function/Charging Gateway Function |
| Sy | Online Charging System | Policy Control Resource Function |
| Sp | Policy Control Resource Function | Common Network Repository |
| Prop 1 | Diameter Agent 5 | 3rd Party Online Charging System |
| Rx | Application Function (Proxy-Call Session Control Function) | Policy Control Resource Function |
| Sd | Traffic Defection Function | Policy Control Resource Function |
| S9 | H-Policy Control Resource Function | V-Policy Control Resource Function |

| Diameter Edge Zone | | |
|---|---|---|
| Interface | Node A | Node B |
| S6a | Common Network Repository | V- Mobile Management Entity |
| S6d | Common Network Repository | V- Serving GPRS Support Node |
| S9 | H- Policy Control Resource Function | V- Policy Control Resource Function |
| Ro | Application Server | 3rd party Online |

| Diameter Agent | Diameter Network | Agent Type | Session State | Inner/Outer location | Additional Attributes |
|---|---|---|---|---|---|
| DA1 | EPC | Relay Agent | Stateless | Inner | None |
| DA2 | IMS | Relay Agent | Stateless | Inner | None |
| DA3 | PCC | Proxy Agent | Stateful | Inner | None |
| DA4 | PCC | Proxy Agent | Stateful | Inner | HTTP Proxy |
| PCC DEA | PCC | Proxy Agent | Stateful | Outer | None |
| EPC DEA | EPC | Proxy Agent | Stateful | Outer | None |
| DA5 | OCS | Proxy/Translation Agent | Stateful | Both | OCS Business Logic |

| Interface/Protocol | Diameter Network |
|---|---|
| Prop 1 | OCS |
| Prop 1 | OCS |
| Prop 3 | OCS |
| Prop 4 | PCC |
| Prop 5 | PCC/OCS |
| Prop 6 | PCC |

SYSTEM AND APPARATUS FOR PROVIDING SUBSCRIBER MANAGEMENT TO SUPPORT COMMUNICATIONS

FIELD OF THE DISCLOSURE

The present disclosure relates generally to communications and more particularly to providing subscriber management for supporting communications.

BACKGROUND

As communications technology improves and demand for communication services grows, providers often seek to adjust those systems to incorporate the improved technology and expand those systems to accommodate the growing demand. Systems that are slow to adjust or expand can be undesirable and are often rendered obsolete. Systems that expand by providing unnecessary redundancy are inefficient and costly.

BRIEF DESCRIPTION OF THE DRAWINGS

FIG. 6 depicts tables for interfacing between network elements in an exemplary configuration of the communication system of FIG. 5;

FIG. 12 depicts tables that summarize the agents and interfaces of the baseline architecture of FIG. 11;

DETAILED DESCRIPTION

Figure 1:
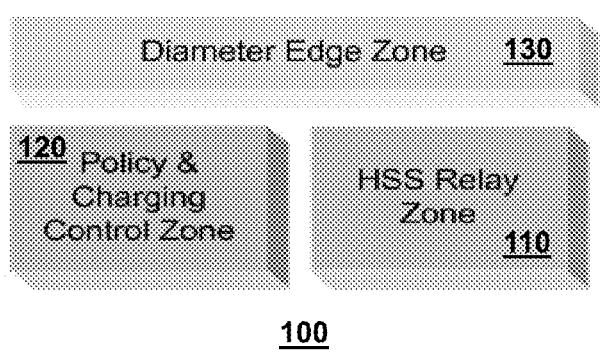
FIG. 1 depicts an illustrative embodiment of zones of a communication system.

The present disclosure describes, among other things, illustrative embodiments to provide a system in which the architecture can be independent of the services being provided. Routing zones that include one or more agents can be established where the agents can facilitate routing between network elements of the routing zone during a communication session. In one embodiment, the agent performing routing in the zone that processes subscriber management can be a relay agent that selectively adjusts routing information but does not examine and/or does not adjust non-routing Attribute Value Pairs (AVP) in a Diameter protocol message. The other agents of the other zones can be proxy agents (with or without translation agents) that selectively adjust routing information and messages including non-routing AVPs.

The present application is related to U.S. application Ser. No. 13/471,833 filed contemporaneously herewith on May 15, 2012 which is entitled "System and Apparatus For Providing Communications", the disclosure of which is incorporated herein by reference in its entirety. The present application is related to U.S. application Ser. No. 13/471,831 filed contemporaneously herewith on May 15, 2012 which is entitled "System and Apparatus For Providing Control And Charging To Support Communications", the disclosure of which is incorporated herein by reference in its entirety.

One embodiment of the present disclosure describes an apparatus that includes a memory storing computer instructions, and a processor coupled with the memory, wherein the processor, responsive to executing the computer instructions, performs operations. The operations include receiving messages utilizing a Diameter protocol from first network elements that provide subscriber management where the messages are for a communication session and maintaining transaction state during the communication session without maintaining session state where the processor selectively adjusts routing attribute value pairs for the messages without adjusting non-routing attribute value pairs for the messages. The operations also include routing the messages utilizing the Diameter protocol to second network elements that provide the subscriber management, and providing at least one of the messages to a Diameter edge agent server that maintains transaction and session state during the communication session for routing the at least one message to an external network.

One embodiment of the present disclosure describes a method including utilizing a first agent function to route messages between network elements that provide subscriber management for a communication session, utilizing the first agent function to maintain transaction state during the communication session without maintaining session state, and utilizing the first server to selectively adjust routing information for the messages without adjusting non-routing information for the messages.

One embodiment of the present disclosure describes a non-transitory computer-readable storage medium comprising computer instruction which, responsive to being executed by a processor, cause the processor to perform operations comprising routing messages utilizing the Diameter protocol between network elements that provide subscriber management for a communication session and maintaining transaction state during the communication session without maintaining session state. The operations also include selectively adjusting routing information for the messages without adjusting non-routing information for the messages.

For illustration purposes only, various functions (e.g., P-CSCF) and/or Diameter agents, such as Diameter agent functions (e.g., relay, proxy and/or translation agents), may be used herein without the word "device," "server," or "agent function." It is, however, understood that any form of an agent or function, including Diameter agents and CSCF's, operate in one or more of devices, systems, components, or other forms of centralized or distributed hardware and software. It is further noted that these terms and other terms such as DIAMETER commands are terms can include features, methodologies, and/or fields that may be described in whole or in part by standards bodies such as 3rd Generation Partnership Project (3GPP). It is further noted that some or all embodiments of the subject disclosure may in whole or in part modify, supplement, or otherwise supersede final or proposed standards published and promulgated by 3GPP, including generating proprietary devices and/or processes that include at least a portion of the standards but supplement the standards. It should be further noted that a device or function that utilizes or otherwise operates according to a protocol (e.g., Diameter protocol or Radius protocol) can utilize all or a limited portion of the features of the protocol with or without supplementation of other features or adjustment of existing protocol features.

FIG. 1 depicts an illustrative embodiment of a communication network 100, which can facilitate establishing communications via one or more technologies such as via an Evolved Packet System (EPS) and/or an Internet Protocol Multimedia Subsystem (IMS). Network 100 can utilize one or more packet-based signaling protocols, such as Diameter and/or Session Initiation Protocol (SIP). In one embodiment, network 100 can operate without utilizing signaling that is based on Signaling System #7 (SS7) protocol.

In one embodiment, network 100 can employ Diameter protocol in the EPS and/or the IMS for a variety of purposes including registration, authentication, location management, the exchange of user data, policy control, and/or charging (e.g., online and/or offline). As an example, Diameter agents as defined in RFC 3588, the disclosure of which is hereby incorporated by reference, can be employed by the network 100 to improve scalability by centralizing the routing of Diameter messages.

Network 100 can be divided into at least three routing zones for: the Home Subscriber Server (HSS) function (HSS relay zone 110), the policy and charging control (PCC) function (PCC zone 120), and routing messages to and from external networks (Diameter edge zone 130). In this embodiment, each routing zone 110, 120, 130 can make use of a specialized Diameter agent function to route messages via Diameter interfaces. In one embodiment, these interfaces can be standards compliant. In another embodiment, extensions to standard interfaces may also be implemented in addition to, or in place of, one or more of the standards compliant interfaces. In one embodiment, each of zones 110, 120, 130 can operate independently of each other where the network element messages associated with the subscriber management and the policy control and charging do not cross zone boundaries.

Figure 2:
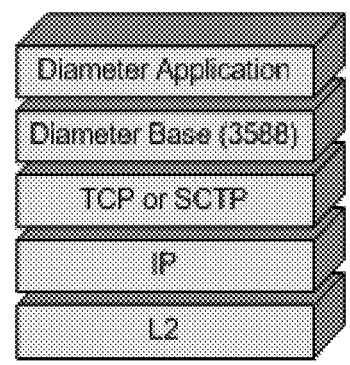
FIGS. 2-4 depict examples of interaction of a protocol stack, network elements, and message structure for the zones of FIG. 1.

Network 100 can utilize the Diameter protocol which is a peer-to-peer, extensible protocol that is intended to provide an AAA framework for applications, such as network access or IP mobility. As shown in FIG. 2, the Diameter specification is comprised of three layers: the transport layer, the Diameter base protocol, and the Diameter application. In one embodiment, the Diameter protocol utilized by network 100 can make use of the AAA transport profile specified in RFC 3539, the disclosure of which is hereby incorporated by reference. The Diameter protocol being used by network 100 can be utilized in conjunction with one or both of Transmission Control Protocol (TCP) and Stream Control Transmission Protocol (SCTP) for transport.

Figure 3:
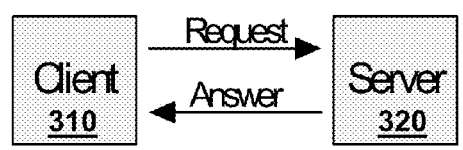

In one embodiment, Diameter messages in network 100 can be transported in a synchronous manner involving request and answer messages as shown being transmitted between client 310 and server 320 of FIG. 3. The client 310 and server 320 can represent or otherwise be resident on various network elements found in zones 110, 120, 130 of network 100, as will be discussed later. The Diameter client 310 can initiate a request to a Diameter server 320 which provides an answer. The network element or node can be a client 310 for some messages and can be a server 320 for other messages. In one or more embodiments, the network element or Diameter node, can act as both the client and the server.

Figure 4:
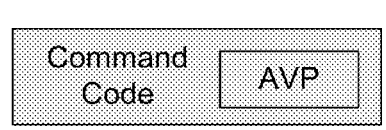

Each Request/Answer pair transmitted in network 100 can be a message 400 (shown in FIG. 4) assigned a command code. Some command codes can be specified in the base protocol while others can be specified by the Diameter applications. In one embodiment, data can be exchanged by use of AVPs which can be specified in the base protocol and/or in the applications (e.g., Diameter applications). As an example, RFC 5516 provides a list of command codes that are specific to the EPS while RFC 3589 provides a list that is specific to the IMS. Other command codes and AVPs can also be utilized, such as those described in 3GPP TS 29.230. Network 100 can also allow for the creation of new command codes and/or AVPs.

In addition to clients 310 and servers 320, network 100 can also utilize agents as Diameter nodes. Diameter agents can be used to improve scalability and reliability by centralizing the routing of Diameter messages, while also enabling translation of messages from one AAA format to another. The types of Diameter agents that can be used by network 100 include relay agents, redirect agents, proxy agents and/or translation agents. Network 100 can use relay agents to route messages between clients 310 and servers 320 based on information contained within the message 400. The relay agents can remain in the signaling path for the duration of the Diameter session and therefore can maintain transaction state. Relay agents can modify and/or remove routing information, but relay agents do not modify any other portion of the message. Network 100 can use proxy agents which are similar to relay agents except that proxy agents can modify the entire Diameter message or any portion thereof. As a result, proxy agents can maintain both transaction and session state. Network 100 can use a redirect agent that provides the client with information necessary to route the message to the server. Redirect agents are not involved with the transport of the answer message back to the client 310, nor do they modify Diameter messages. As a result, redirect agents maintain neither transaction, nor session, state. Network 100 can use translation agents to translate between different protocols. An example of this is a translation agent that translates between RADIUS and Diameter protocols. Translation agents of network 100 can maintain both transaction and session state.

Figure 5:
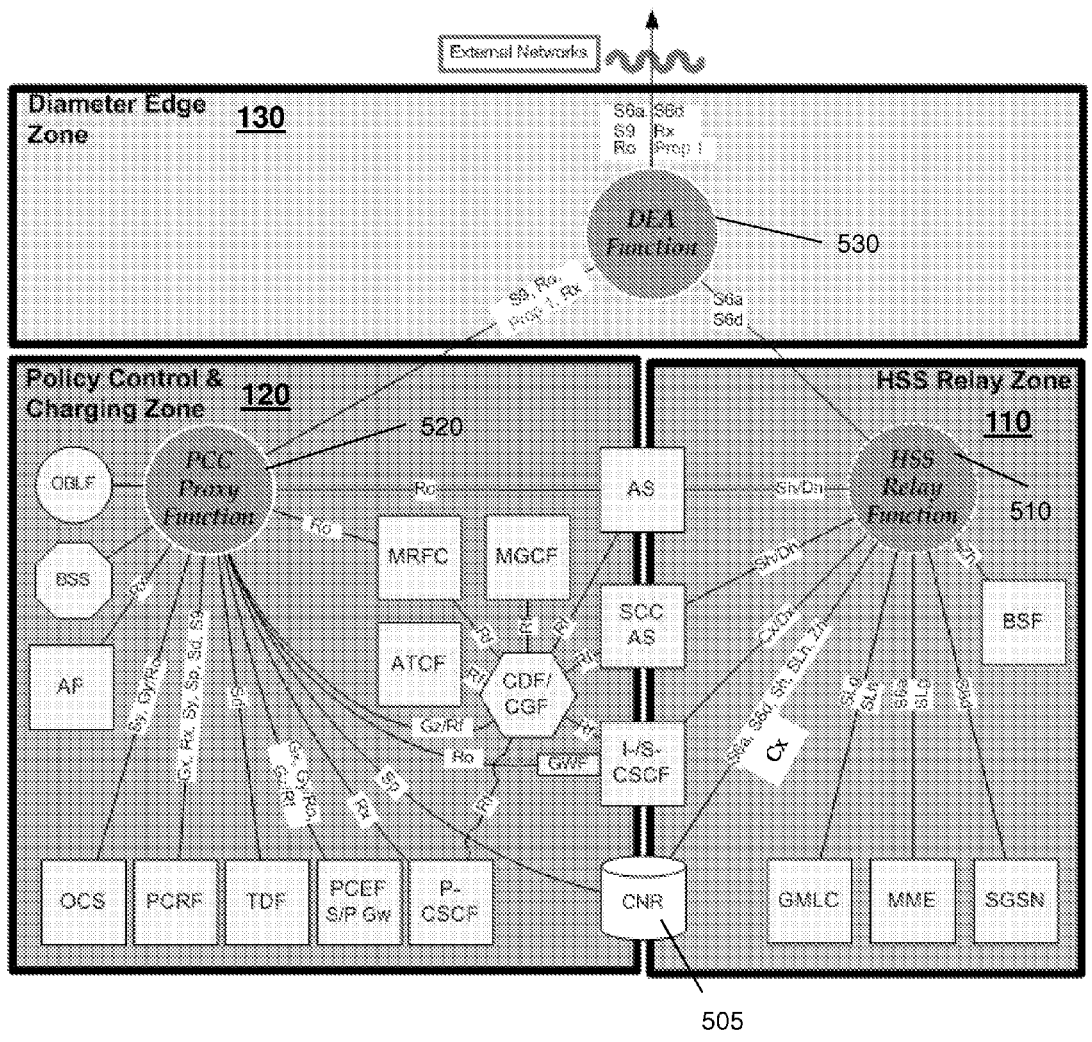
FIG. 5 depicts an exemplary configuration of network elements within the zones of FIG. 1.

Referring to FIG. 5, network 500 is illustrated that depicts an exemplary configuration of network elements for the HSS relay zone 110, the PCC zone 120, and the Diameter edge zone 130. The configuration of network 500 provides network integration by reducing network implementations that are silo configurations. Network 500 defines logical Diameter routing zones based on specific use cases for Diameter in the EPS and IMS. Network 500 utilizes Diameter agents to support scalability, but minimizes their redundancy. For instance, a single Diameter agent can be utilized in each of the HSS relay zone 110, the PCC zone 120, and the Diameter edge zone 130, although other embodiments can use multiple agents. Network 500 can utilize various interfaces, including 3GPP interfaces.

Each of zones 110, 120, 130 can make use of a unique Diameter agent function and can each have its own set of engineering and/or performance requirements. The zones and/or Diameter agent functions can scale differently. In one embodiment, one or more of the network elements can span both the HSS relay zone 110 and the PCC zone 120.

The HSS relay zone 110 can include all network elements or Diameter nodes including all functions that communicate with the Mobile Management Entity (MME) and with the HSS, which can be embodied in a Common Network Repository (CNR) 505. These Diameter nodes can include the Serving GPRS Support Node (SGSN), the Gateway Mobile Location Center (GMLC), and the Bootstrapping Function (BSF). These Diameter Nodes can also include the Interrogating/Serving Call Session Control Function (I-/S-CSCF), the Application Server(s) (AS), and the Service Centralization & Continuity (SCC) AS, which, for example, may span the HSS relay zone 110 and the PCC zone 120, although the exemplary embodiments can also include these Diameter nodes in only one zone or the other.

The PCC zone 120 can include Diameter network elements for implementing, enforcing and controlling charging and policy. For example, in one embodiment, the Diameter network elements and/or the implemented functions can be those that are part of the 3GPP Policy and Charging Control architecture defined in 3GPP TS 23.203 and the Charging Architecture defined in 3GPP TS 32.240, the disclosures of which are hereby incorporated by reference. The PCC zone 120 can support both internal and external Online Charging Systems (OCSs) and can include an Online Business Logic Function (OBLF) to mediate IMS level online charging. Network 500 can utilize real-time session management and QoS, which involve the synchronization and simultaneous use of charging and policy control, to intertwine these functions and their corresponding network elements.

The PCC zone 120 can include the Policy Control Resource Function (PCRF), the Policy Control Enforcement Point (PCEF), the Application Function (AF) which can be the Proxy CSCF (P-CSCF), the Subscriber Profile Repository (SPR) which can be embodied in the CNR, the Online Charging System (OCS), the Offline Charging System (OFCS) which can be implemented by a Charging Data Function (CDF) and Charging Gateway Function (CGF), the AS, the Media Resource Controller Function (MRFC), the Traffic Detection Function (TDF), and the Gateway Function (GWF) from the S-CSCF.

The Diameter edge zone 130 can act as an external gateway between the service provider and other 3rd party networks.

The HSS relay zone 110 can utilize a relay agent function such as HSS relay agent 510. In one embodiment, the HSS relay agent 510 can implement a Subscriber Location Function (SLF) by relaying Diameter messages to the HSS. As a relay agent, HSS relay agent 510 can modify routing information but it does not examine or alter non-routing AVPs. HSS relay agent 510 can maintain transaction state but does not maintain session state. The HSS relay agent 510 can route all messages to and from the HSS, and can route messages between the MME and GMLC via the SLg reference point.

The PCC zone 120 can utilize a proxy and translation agent function such as PCC proxy agent 520. In one embodiment, the PCC proxy agent 520 can implement at least the 3GPP DRA proxy agent function described in 3GPP 29.213, the disclosure of which is hereby incorporated by reference, for the policy control network and a combined proxy/ translation agent and online charging business function for the charging network. The PCC proxy agent 520 can map policy control network elements (e.g., PCRF, SPR, OCS) and/or charging network elements (e.g., OCS, AS) together on a per user and/or per session basis. In one embodiment, the PCC proxy agent 520 can create a binding per user session between the PCRF and various network elements and also between the OCS and various network elements. In one embodiment, for certain use cases involving online charging, the PCC proxy agent 520 can execute business logic resulting in the modification of Diameter charging messages. As a proxy agent, the PCC proxy agent 520 is able to modify Diameter messages and as a translation agent, it is able to interwork between Diameter applications and between Diameter and other AAA protocols (e.g., RADIUS messages). The PCC proxy agent 520 can maintain both transaction and session state. The PCC proxy agent 520 can route all messages to and from the PCRF and to and from the OCS. In one embodiment, the routing of offline charging messages can be static and does not go through the PCC proxy agent 520. In another embodiment, the PCC proxy agent 520 can perform the translation agent function between 3rd party external network OCS (e.g., via DEA 530 described later) and the network elements.

The Diameter edge zone 130 can use a proxy agent function such as a Diameter Edge Agent (DEA) 530. In one embodiment, the DEA 530 can be a proxy agent that implements at least the edge agent function described in GSMA PRD IR.88, the disclosure of which is hereby incorporated by reference. The DEA 530 can provide an "outer" proxy function for various external network connectivity, which may or may not be connectivity with an external network(s) operated by a 3rd party. As a proxy agent, DEA 530 can be capable of modifying Diameter messages. DEA 530 can maintain both transaction and session state. In one embodiment, the DEA 530 can perform various security functions including one or more of topology hiding, IPSec, and screening.

The HSS relay zone 110 can make use of a session stateless diameter agent function and therefore can be described as "stateless" while the PCC and DEA Zones 120, 130 can make use of session stateful agents. The PCC and DEA Zones 120, 130 may be described as "stateful." In one embodiment, the PCC proxy agent and the DEA are proxy and translation agents.

Referring to FIG. 6, tables 600 describe an exemplary configuration of interfaces that can be utilized by the network elements and Diameter agents of network 500. In this example, standardized Diameter interfaces and applications can be implemented by the network 500, although proprietary or other interfaces and/or extensions can also be utilized in combination with, or in place of, one or more of the standardized interfaces and/or applications.

The OBLF in the PCC zone 120 may be integrated into the PCC proxy agent 520 or it may be implemented as a stand-alone function device. In one embodiment, the OCS shown within the PCC zone 120 may evolve into a complete OCS as defined in 3GPP 23.240, the disclosure of which is hereby incorporated by reference, including providing support for an Online Charging Function (OCF), an Account Balance Management Function (ABMF), and a Rating Function (RF), which may also be located in the PCC zone 120, including resident on the OCS server or on another device(s). In another embodiment, the OCS may support real-time session management at both the bearer level (e.g., via Sy and Gy/Ro interfaces) and/or at the IMS level (e.g., via the Ro interfaces). In one embodiment, the network 500 can support $3^{rd}$ Party OCS(s), which are connected to the PCC zone 120 via the DEA 530. In another embodiment, one or more additional Diameter agents may be implemented for the Gz/Rf and Rf interfaces.

Figure 7:
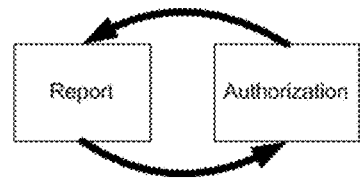
FIGS. 7-8 depict interaction between network elements of the communication system of FIG. 5.
Figure 8:
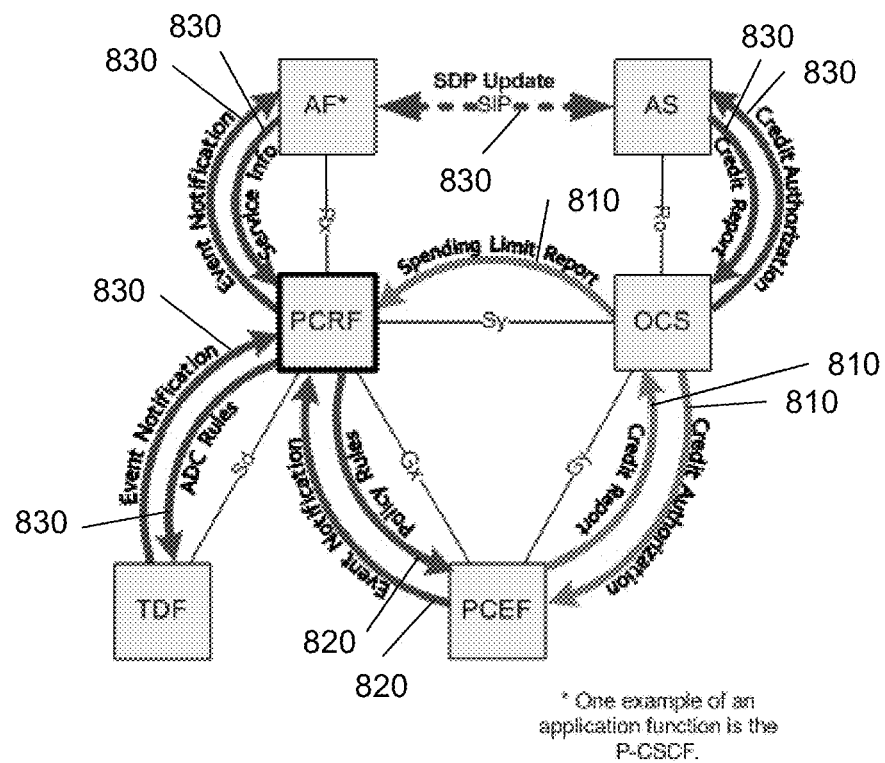

Referring to FIGS. 7 and 8, the network 500 can implement real-time session management via a continuous, two-step process 700 that includes authorization of resources followed by a report describing the usage of those resources, as shown in FIG. 7. In one embodiment of network 500, authorization for an Enhanced Packet Core (EPC) can be enabled through the use of policy control and reporting, which utilizes credit control mechanisms (i.e., charging). In another embodiment of network 500, authorization for the IMS can be implemented by using policy control and/or by logic residing within an AS. In this example, similar to the EPC, reporting can be implemented using credit control. FIG. 8 illustrates a process 800 that enables policy control and charging to be intertwined in the network 500. Process 800 is a superposition of two real-time session management processes: one operating at the bearer level (i.e., the EPC) and one at the service layer (e.g., the IMS).

The real-time session management of network 500 in the EPC can involve the use of charging and policy control via the Gy, Sy, and Gx reference points as depicted by the arrows 810, 820 in FIG. 8. Real-time charging reports can be provided by the PCEF to the OCS via the Gy reference point. The OCS, in turn, can provide information about charging related events to the PCRF via the Sy interface in a spending limit report. As an example, the spending limit report can be provided according to 3GPP TS 29.219, the disclosure of which is incorporated by reference, although other procedures or guidelines can be utilized for providing the report. The PCRF can then provide updated PCC rules to the PCEF via the Gx reference point, and the PCEF may provide event information back to the PCRF.

The real-time session management of network 500 in the IMS can involve the use of charging and may involve the use of policy control via the Rx, Sd, and Gx reference points as shown by the arrows 820, 830 in FIG. 8. Real-time charging reports can be provided by the AS to the OCS via the Ro reference point. The OCS, in turn, may authorize the use of additional resources. Policy control may be modified by the AF on behalf of an AS. In one embodiment, SIP can be utilized as a method of communication between the AS and the AF (represented by a dashed line).

The use of policy control and charging can be intertwined for real-time services because in this embodiment charging is used as the reporting mechanism while policy control is used as an authorization mechanism, and both share common functions, which are the OCS, PCRF and PCEF.

Figure 9:
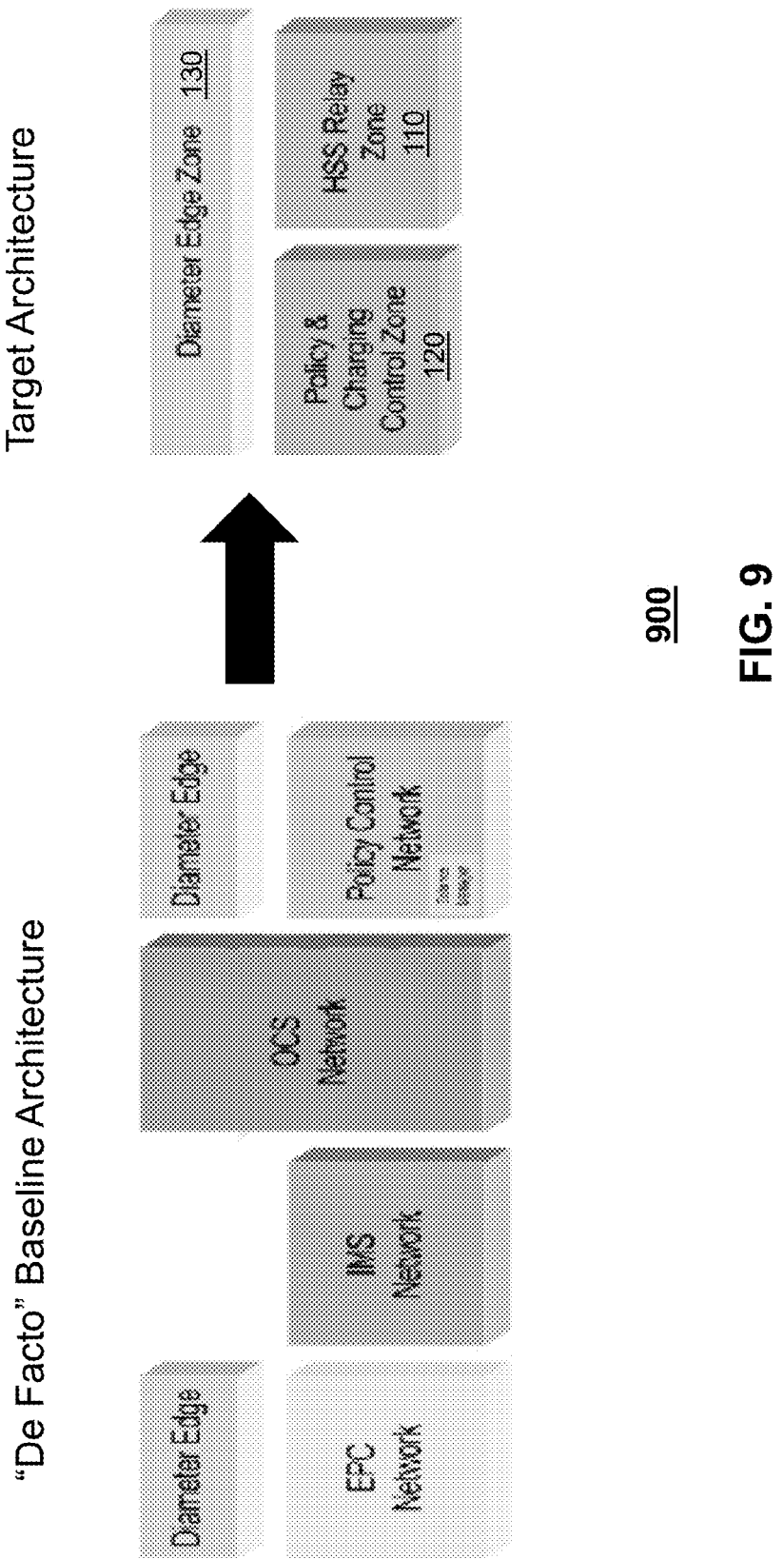
FIGS. 9-11 depict an illustrative embodiment for transitioning between a de facto baseline configuration to the target architecture of the communication system of FIG. 1.
Figure 10:
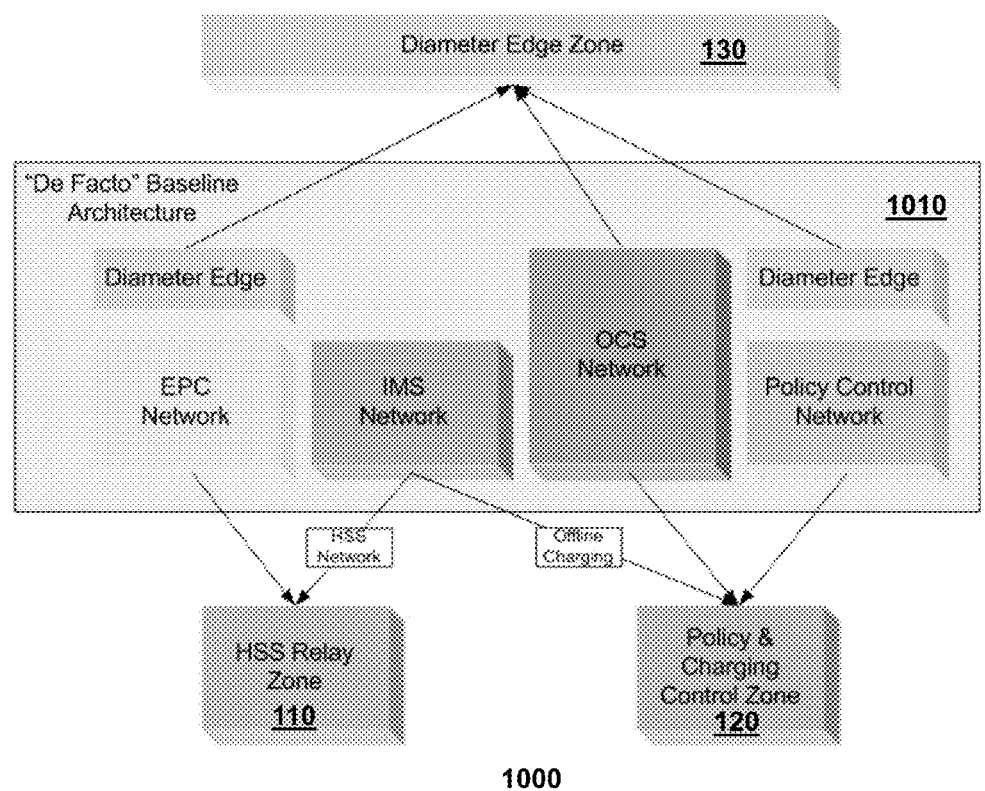
Figure 11:
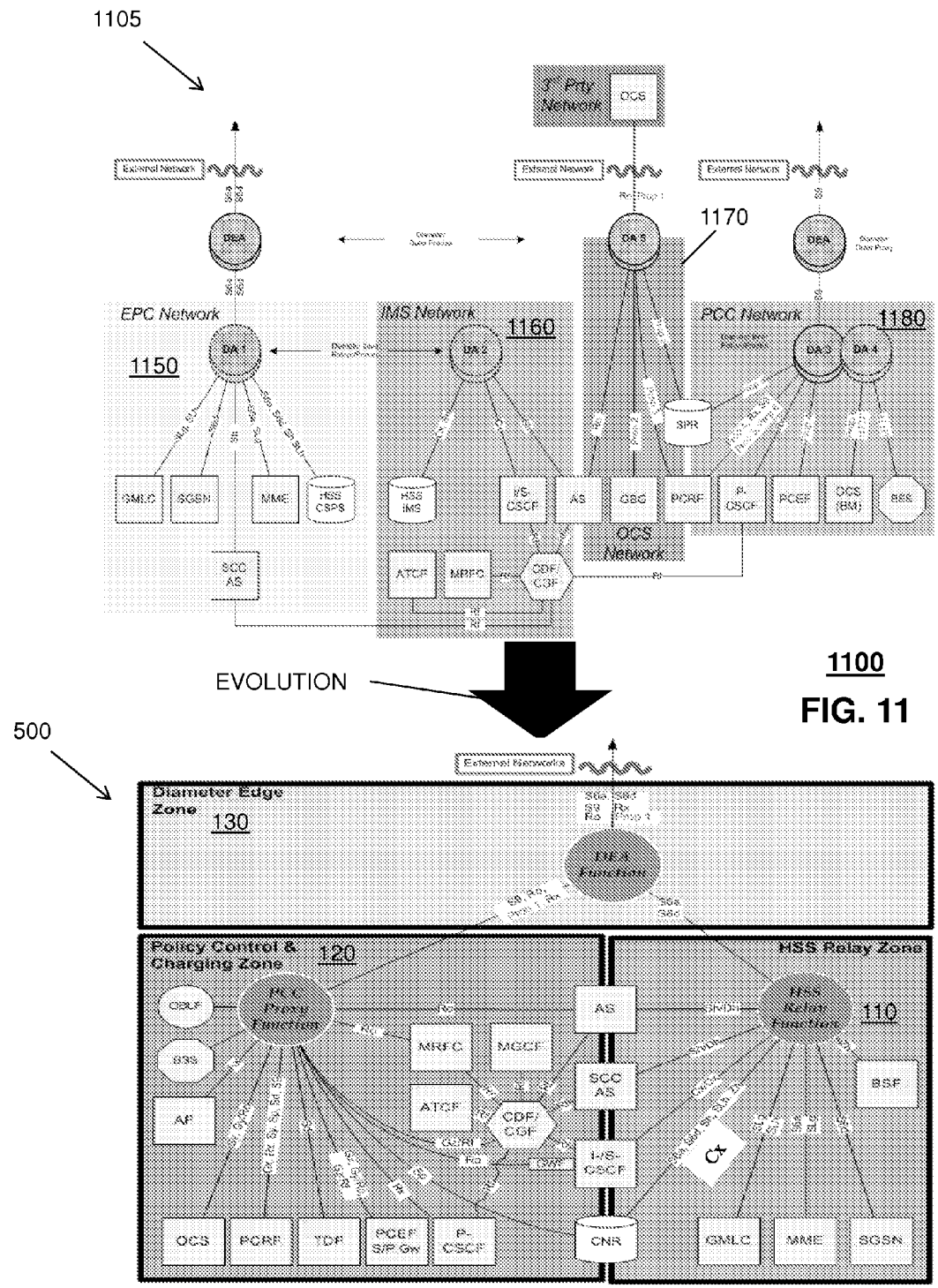
Figure 13:
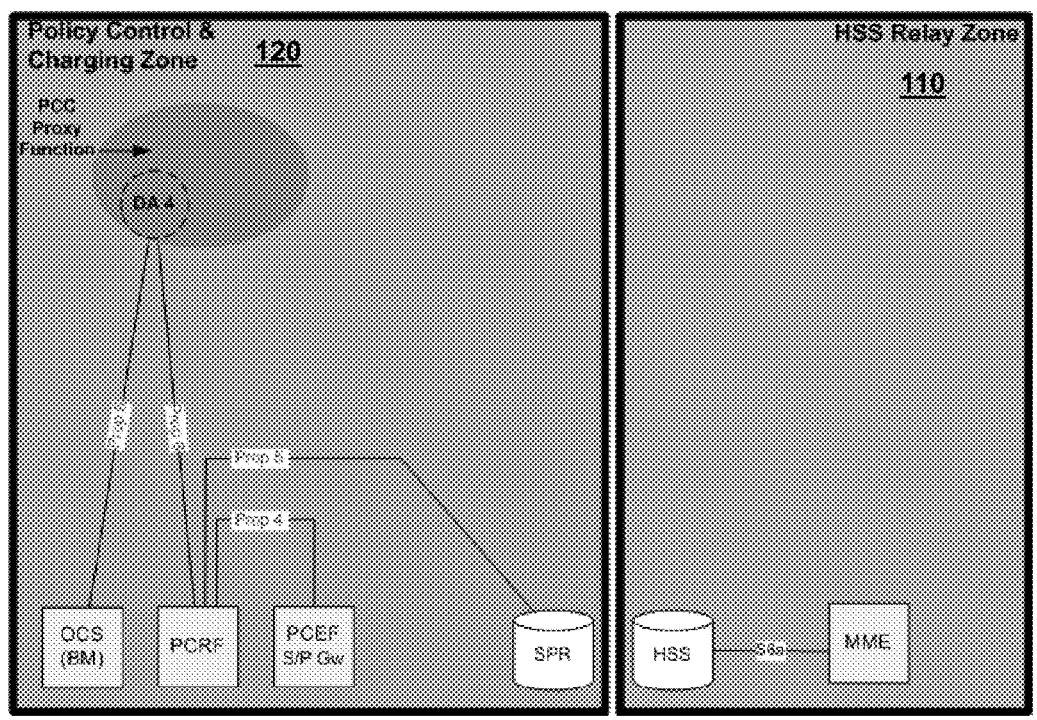
FIGS. 13-16 depict an illustrative embodiment for transitioning between system configurations to obtain the communication system of FIG. 5 through use of a multi-stage process.
Figure 14:
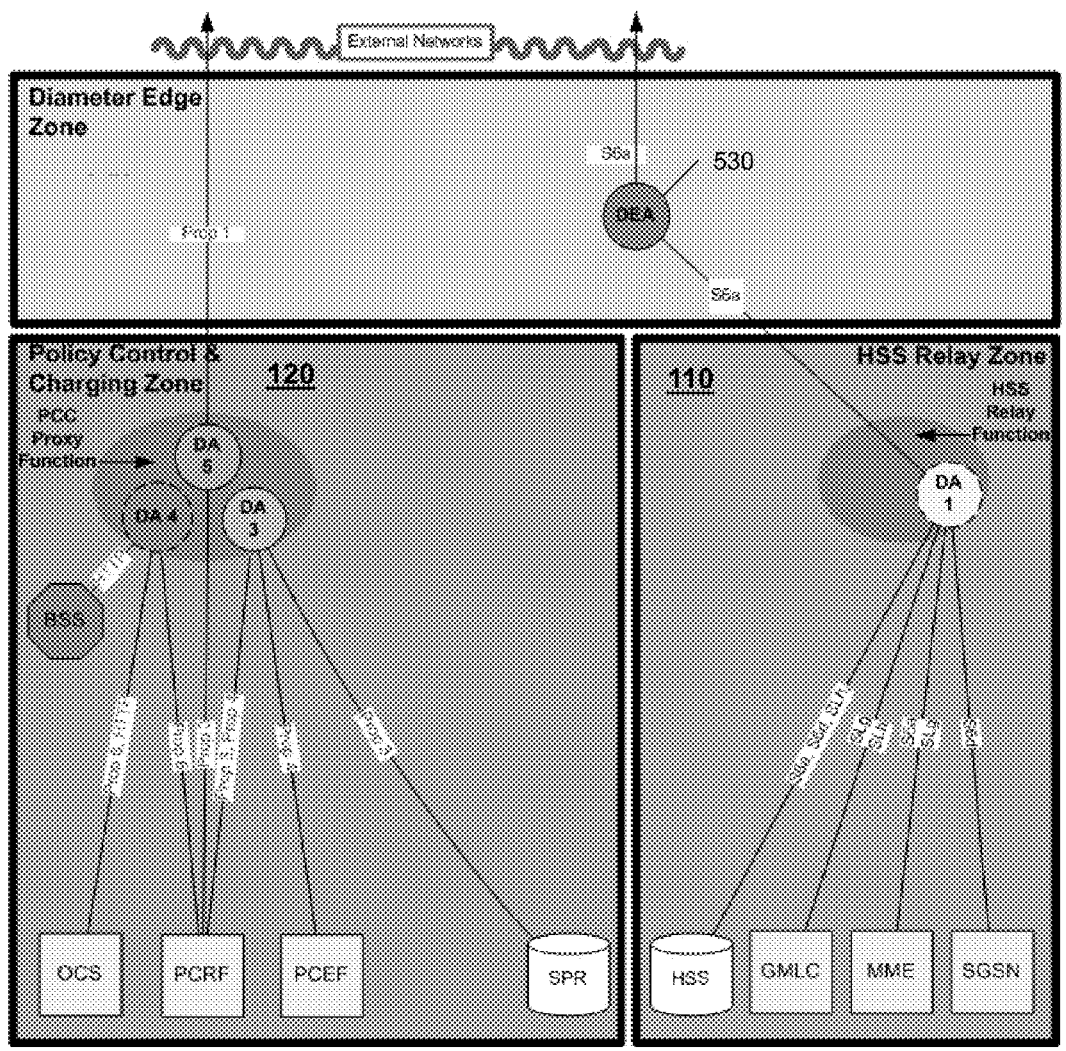
Figure 15:
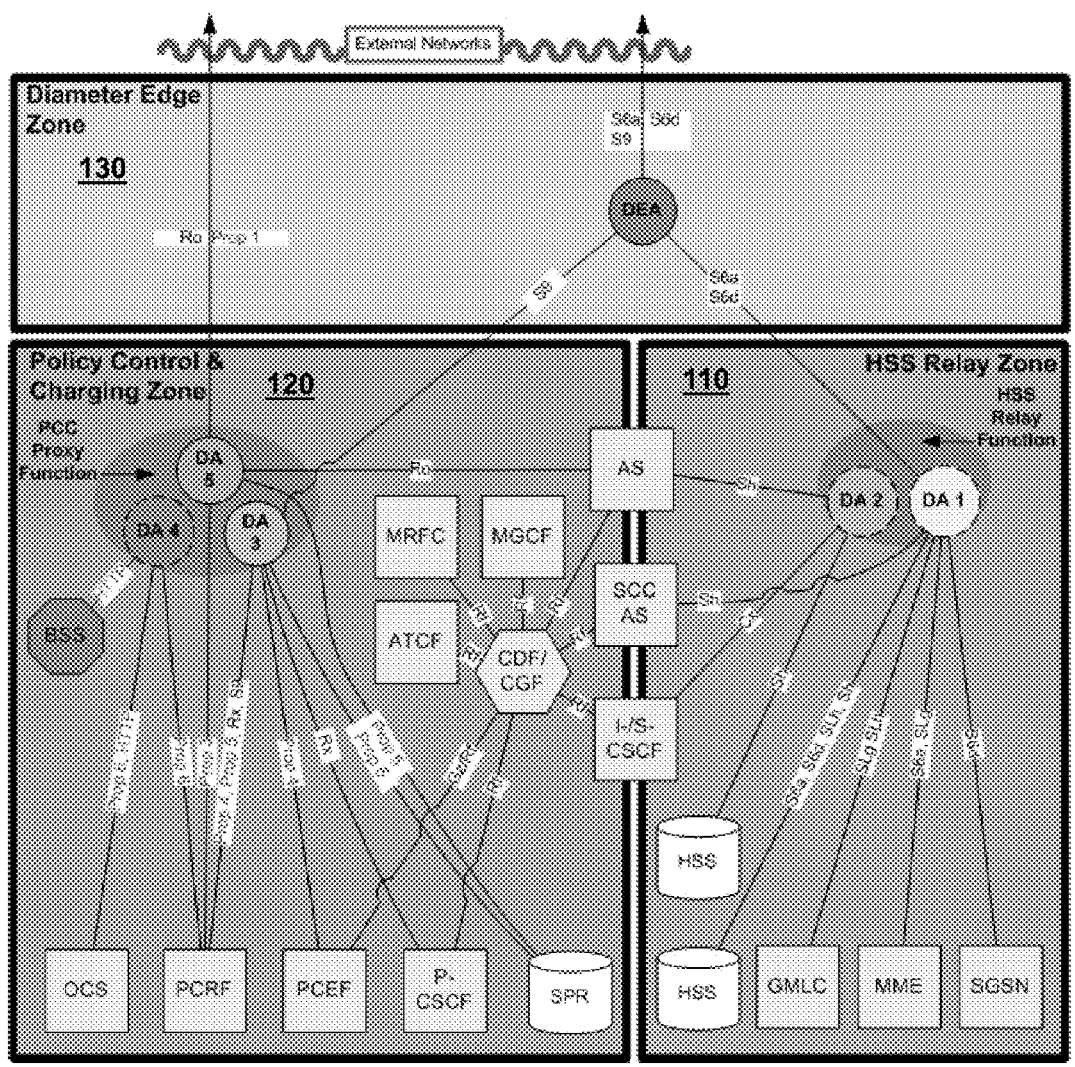
Figure 16:
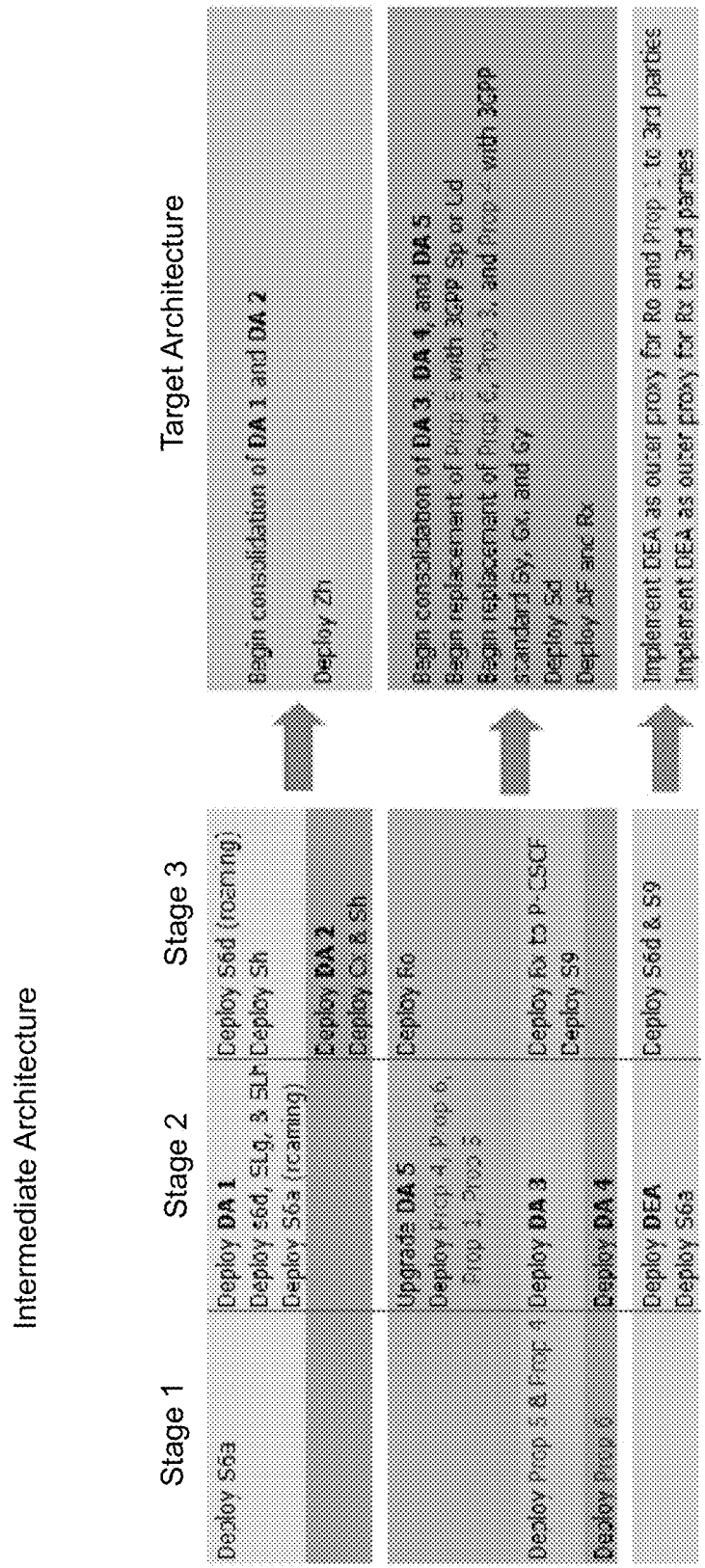

To achieve the target architecture of network 100 and/or 500, multiple implementations can evolve as shown in FIGS. 9-11. In one embodiment, this evolution can include the deployment of Diameter interfaces, the deployment and consolidation of Diameter agents, and the replacement of proprietary interfaces with standardized interfaces. FIG. 9 illustrates the evolution process 900 in which some or all of existing Diameter architecture silos can be integrated and some or all of vendor proprietary protocols can be replaced with standards-based and/or service provider-based proprietary protocols. FIG. 10 illustrates a mapping 1000 of a "de facto" baseline architecture 1010 created based on realignment and integration of separate networks operating under Diameter protocol which can be further realigned and/or modified to create the target architecture, such as network 100 or 500. For instance, the HSS, that is part of the IMS, can be combined with the EPC network to create the HSS relay zone 110. The policy control network, the OCS network and the offline charging can be combined to create the PCC zone 120. The Diameter edge functions can be combined into a single Diameter edge zone. One or more of the proprietary applications can be replaced with standardized applications. In one embodiment, the Prop 1 interface to the 3rd party external network is not replaced.

FIG. 11 illustrates the transformation or evolution of multiple silo'ed communication system infrastructures into the de facto baseline architecture 1105 which then can further evolve into the target architecture of network 100 or 500. The baseline architecture 1105 prior to evolution to the target architecture of network 500 includes functions and/or devices, some or all of which can be retained for use in the network 500 with or without modification. One or more of the exemplary embodiments can also eliminate in whole or in part one or more of the functions and/or devices described with respect to the baseline architecture 1105 when implementing network 100 or 500.

The infrastructure of the baseline architecture 1105 can include EPC network 1150, the IMS network 1160, the Charging network 1170 and the Policy Control network 1180. The baseline EPC network 1150 can utilize two Diameter agents, where one agent is stateless and routes messages to and from the HSS within the EPC. In addition to HSS routing, this agent of baseline EPC network 1150 can route location messages between the MME and GMLC (e.g., via the SLg interface). The baseline EPC network 1150 can also utilize a separate second agent in EPC network 1150 that is session and transaction stateful and which can be used as a border gateway to route messages between the EPC and external networks to support roaming. The EPC network 1150 can include network elements such as the HSS which provides the HSS function for the EPS; the MME which can be a control plane node within the EPC; the SGSN which can be a 2/3G packet core node; and the GMLC which supports location services. The SGSN of the target architecture of network 500 can be upgraded to support roaming from Long Term Evolution (LTE) to 2/3G.

The baseline IMS network 1160 can utilize Diameter protocol for routing messages to and from the HSS and to transport offline charging messages to the CDF/CGF. The baseline IMS network 1160 can also make use of a stateless Diameter agent to route messages to and from the HSS. Unlike the baseline EPC network 1150, the baseline IMS network 1160 may not peer with other networks using a Diameter interface and may operate without utilizing a Diameter Edge Agent. Offline charging messages in the baseline IMS network 1160 can be transported via Diameter protocol directly from the network element to the CDF/CGF and Diameter agents may not route these billing reports because the routing can be statically defined between the network elements and the CDF/CGF. In the baseline IMS network 1160, the HSS can provide the HSS function within the IMS and can be separate from the HSS within the EPS while the I- and S-CSCFs can be control plane nodes within the IMS and an Access Transfer Control Function (ATCF) and SCC AS can be involved with domain transfer from the IMS to circuit switched networks. The AS of the baseline IMS network 1160 can provide services to users while the CDF/CGF is the offline billing function. The baseline OCS network 1170 can include an Diameter agent/OBLF (DA 5) to route, translate, and in some cases modify messages between an external OCS and various network elements including the AS(s), the Generic Billing Gateway (GBG) which can be used for SMS billing, the PCRF, and the SPR which can be a Lightweight Directory Application Protocol (LDAP)-based database. DA 5 of baseline OCS network 1170 can function as a proxy/translation agent, a border gateway, and it can execute operator defined business logic related to online charging. DA 5 can route Ro from the AS(s) to the external network OCS; translate and route proprietary protocol and proprietary Diameter applications such as Prop 3 to a $3^{rd}$ party proprietary Diameter application labeled Prop 1; and communicate with an SPR database via Prop 5 which can be LDAP or Diameter-based and can use this information to execute operator defined business logic related to online charging.

The baseline PCC network 1180 can utilize three stateful Diameter proxy agents. One proxy agent, called DA 3, can route messages to and from the PCRF within the PCC network 1180 and can map policy control network elements together on a user session basis while supporting standard and several proprietary Diameter applications such as Prop 4 and Prop 6, as well as LDAP-based Prop 5. The baseline PCC network 1180 can utilize another separate proxy agent, called DA 4, and can route messages between the PCRF and an OCS as well as HTTP provisioning flows from a Business Support System (BSS) and the OCS, while supporting the proprietary Diameter application Prop 6. The baseline PCC network 1180 can utilize yet another Diameter agent as a border gateway to route messages between the PCC network 1180 and external networks to support roaming. The baseline PCC network 1180 can have six network elements that include the PCRF which determines the policy rules; the PCEF which is responsible for enforcing the policies determined by the PCRF; the P-CSCF which is an IMS control plane network element that functions in the PCC network 1180 as an AF; and an OCS that provides balance management capabilities and is provisioned by the BSS. The SPR of baseline PCC network 1180 can contain subscription information. Baseline architecture 1105 illustrates the integration, in whole or in part, of four separate Diameter networks, three of which utilize an "outer proxy" to connect to external Diameter networks.

In one embodiment, the baseline architecture 1105 of FIG. 11 can be modified by the SCC AS being connected to DA 1 Diameter via an Sh interface and placed within the EPC network 1150, and the P-CSCF being connected to the CDF/CGF via an Rf interface.

In the baseline architecture 1105, the AS can span both the IMS and OCS networks while the PCRF can span both the PCC and OCS networks. The HSS within the EPS and IMS can remain separate and can be located within their respective Diameter networks. "Inner proxies" can route Diameter messages within a Diameter network while "outer proxies" can route messages to and from an external Diameter network. The baseline architecture 1105 can make use of proprietary Diameter applications, as well as standardized Diameter applications. In integrating the baseline architecture 1105, there can be seven different Diameter agents in use. Two of these Diameter agents can be located in the EPC network 1150, three in the PCC network 1180, one in the HSS network 1160, and one in the OCS network 1170. Referring to FIG. 12, table 1200 provides an exemplary summary of the Diameter agents and the applications that can be utilized by the baseline architecture 1105.

The baseline architecture 1105 can evolve into the target architecture 500 which reduces redundancy of the Diameter agents and more efficiently routes and processes the Diameter messages. For example, the PCC proxy agent 520 can take over the functions of or otherwise replace DA 3, DA 4 and DA 5 of the baseline architecture 1105. As another example, the HSS relay agent 510 can take over the functions of or otherwise replace DA 1 and DA 2 of the baseline architecture 1105.

Referring to FIGS. 13-16, an exemplary process for transitioning the de facto architecture 1105 into the three zone target architecture of network 500 is depicted through a multi-stage evolution. The transition process involves deploying Diameter interfaces, deploying and consolidating agents, and replacing proprietary applications with standard ones. In this example, there are four stages 1300, 1400, 1500 and the final stage which is network 500. In one embodiment, stage 1300 can be implemented at the same time as deployment of an LTE network. In the HSS Relay Zone 110, the HSS and MMEs can be deployed and directly connected to each other via an S6a interface. In the PCC Zone 120, the PCRF, PCEF, SPR (which in this case is an LDAP-based database), and an OCS can be deployed and can communicate with each other via proprietary Diameter and LDAP applications, such as Prop 4, Prop 5, and Prop 6. Prop 4 is a proprietary Diameter application from a vendor and is based on 3GPP Gx with additional AVPs to support charging. Prop 5 is a proprietary LDAP application that can communicate between the PCRF and the SPR. Another proprietary Diameter application, Prop 6, can be introduced between the PCRF and an OCS to support session based pricing and it can transport policy control information, quota, and usage reports.

In stage 1400, the SGSN, GMLC, and associated interfaces can be deployed and added to the HSS Relay Zone 110. These new interfaces can include S6d, SLg, and SLh. An HSS Relay function, called DA 1, can be deployed and used to route messages within the HSS Relay Zone 110. Roaming can be supported by the deployment of a DEA 530 which serves as an "outer" proxy for the S6a interface. In the PCC Zone 120, new Diameter applications can be introduced and the PCC Proxy function can be realized by the deployment of three Diameter agents: DA 3 can implement the 3GPP DRA function and can route proprietary Diameter and LDAP messages between the PCRF, PCEF, and the SPR; DA 4 can route proprietary Diameter messages between the OCS and the PCRF as well as HTTP provisioning flows between a BSS and the OCS; and DA 5 can route and interwork proprietary Diameter messages between the PCRF and the external network OCS (which can be a 3rd party network) and can implement the OBLF. An enhanced version of Prop 6, labeled Prop 3, can be deployed between the PCRF and DA 5. DA 5 can interwork this application with a proprietary application of the external network, such as Prop 1 which lies between the OBLF and the external network OCS.

In one embodiment, stage 1500 can coincide with the deployment of IMS. In the HSS relay zone 110, the HSS, AS, and SCC AS can be deployed and can communicate with each other via the Cx and Sh interfaces through an HSS Relay function called DA 2. Together, DA 1 and DA 2 can realize or otherwise provide the HSS Relay function. In the PCC zone 120, the IMS level offline and online charging can be implemented along with the S9 interface for roaming. Offline charging for the packet core and several newly deployed IMS nodes, including the AS, SCC AS, I-/S-CSCF, ATCF, MRFC, and Media Gateway Control Function (MGCF) can be supported via the Gz/Rf and Rf interfaces to the CDF/GCF, respectively. A Diameter agent function may not be required between some of these network elements because the routing can be expected to be substantially static and the delivery of the messages is deemed not time sensitive. Online charging for the AS(s) can be supported via the Ro interface to the external network OCS via DA 5 which may act as a proxy agent and a DEA. A Prop 5 application can be introduced between DA 5 and the SPR to support the OCS Business Logic Function. The S9 interface can be deployed to support roaming scenarios that involve policy control. DA 3 can be used to route the messages associated with the S9 interface to the DEA which provides the "outer" proxy role.

The final stage of the evolution results in network 500 illustrated in FIG. 5. Network 500 can be created from stage 1500 by the addition of new Diameter nodes and interfaces, Diameter agent consolidation, and the replacement of proprietary interfaces. Three new Diameter nodes can be introduced: the AF that is separate from the P-CSCF; the TDF; and the BSF. The new instance of AF can connect to the PCRF via the Rx interface and may be used for services that do not involve IMS. The TDF connects to the PCRF via the Sd interface. The BSF can connect to the CNR via the Zh interface. Both the Rx and the new Sd interface can be routed via the PCC proxy function 520 while the new Zh interface can be routed by the HSS relay function 510.

Figure 17:
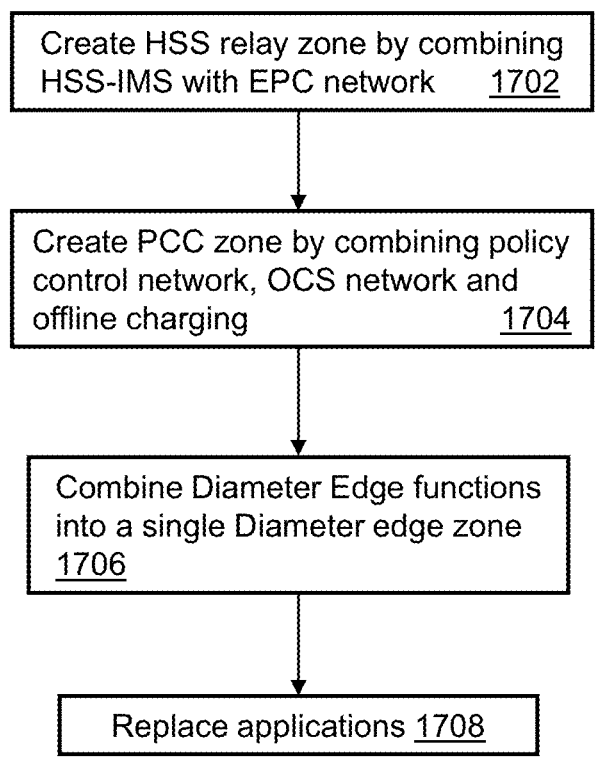
FIG. 17 depicts an illustrative embodiment of a method for providing the network of FIG. 5.

Referring to FIG. 17, a method of creating a target architecture, such as network 500, is illustrated. It should be understood that the particular order of the method steps can be rearranged and that the method can be operated with more or less steps than is illustrated. Further, one or more of these steps can be combined or can be eliminated. In step 1702, DA 1 and DA 2 may be consolidated into a single HSS proxy platform that supports both the EPC and the IMS, via consolidating the HSS, and SPR into the CNR. This can be accomplished by upgrading, if necessary, DA 1 and DA 2 to a common software platform that supports both EPC and IMS reference points and then interconnecting DA 1 and DA 2 to both EPC and IMS network elements. In step 1704, DA 3, DA 4, and DA 5 may be consolidated into a single PCC proxy platform in two steps. The first step is to consolidate DA 3 and DA 4 into a single platform. This may be accomplished in several ways including upgrading both platforms to support both roles or upgrading one platform to support both roles and the retiring of the other. In the second step, DA 5 can be consolidated with the newly created DA 3/DA 4 platform to create a single PCC proxy platform. Like the DA 3/DA 4 consolidation, this may be done in several ways including upgrading DA 5 and DA 3/DA 4 to a common set of functions and using both or upgrading one of the two and retiring the other. The OBLF may be integrated into the new PCC proxy platform or implemented as a separate entity. In addition, in network 500, DA 5 may no longer be used as an "outer" proxy to the external network or other $3^{rd}$ party OCS as this function can be provided by the DEA 530. In one embodiment, if an internal OCS can be introduced for IMS charging, the Ro reference point can connect to it via the PCC proxy agent 520. In step 1706, the Diameter edge functions from the separate Diameter networks can be combined into a single Diameter edge zone.

In one embodiment in step 1708, the transition to network 500 can include some or all of the vendor proprietary applications (e.g., within the PCC zone 120) being replaced with standard applications (e.g., 3GPP) that may contain service provider extensions. Prop 4, Prop 6, and Prop 3 may be replaced with Gx, Gy, and Sy. Prop 5 may be replaced with the 3GPP specified Sp reference point or the LDAP-based Ud reference point. The Prop 1 interface between the external network OCS and the OBLF can remain in place. In one embodiment, network 500 can support the interrogation of out-of region HSSs. In another embodiment, network 500 can include both internal and external OCSs. For instance, the internal OCS can support both bearer and IMS level charging. The internal OCS(s) may also support Sy, Gy/Ro, and Ro interfaces. In one embodiment, the Sp reference point may be Diameter based or may be based on another protocol, such as based on LDAP. In one embodiment, the Gy/Ro reference point is supported on the PCEF.

Figure 18:
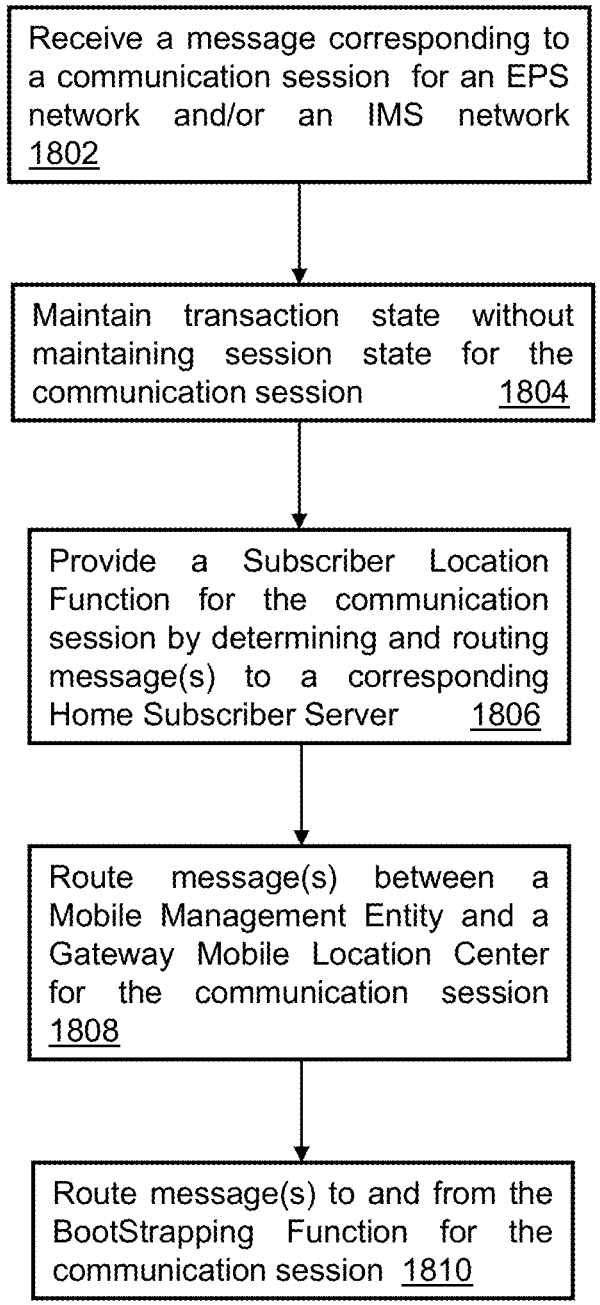
FIG. 18 depicts an illustrative embodiment of a method for providing subscriber management for the network of FIG. 5.

Referring to FIG. 18, a method of supporting subscriber management for EPS and IMS networks, such as network 500, is illustrated. It should be understood that the particular order of the method steps can be rearranged and that the method can be operated with more or less steps than is illustrated. Further, one or more of these steps can be combined or can be eliminated. In step 1802, HSS relay agent 510 can be utilized for a communication session based on one or both of the EPS and IMS components of network 500. The HSS relay agent 510 can receive messages associated with the communication session, which can be one or more of voice, video and data sessions. In step 1804, the HSS relay agent 510 can maintain transaction state associated with the communication session without maintaining session state. For example, the HSS relay agent 510 can ignore or otherwise not expend processing resources for non-routing information (e.g., non-routing AVPs) in the messages while selectively adjusting routing information (e.g., routing AVP's). In the exemplary embodiment of network 500, the messages received by and transmitted from the HSS relay agent 510 are according to Diameter protocol. However, the exemplary embodiments can operate according to other protocols in combination with, or in place, of the Diameter protocol, such as RADIUS protocol. In one embodiment of method 500, all messages that are transmitted to and from the HSS relay agent 510 are according to the same protocol (e.g., Diameter protocol). In another embodiment, all messages being routed within the HSS relay zone 110, the PCC zone 120 and the Diameter Edge zone 130 are according to the same protocol, such as a Diameter protocol.

In step 1806, the HSS relay agent 510 can support a subscriber location function by determining an appropriate HSS (which can be embodied in the CNR of network 500) and/or routing message(s) to the HSS. In one embodiment, this can enable the exchange of subscription-related information (e.g., subscriber profiles), performance of authentication and authorization of the user(s), and/or providing information about the subscriber's location and IP information.

In step 1808, the HSS relay agent 510 can be utilized for routing message(s) between a Mobile Management Entity (MME) and a gateway mobile location center (GMLC). In one embodiment, this can enable idle mode UE (User Equipment) tracking and paging procedure including retransmissions; bearer activation/deactivation processing; selection of a SGW for a UE at the initial attach and at time of intra-LTE handover involving Core Network (CN) node relocation; authenticating the user via interacting with the HSS; generation and allocation of temporary identities to UE's; checking the authorization of the UE to camp on the service provider's Public Land Mobile Network and enforcing UE roaming restrictions; being the termination point in the network for ciphering/integrity protection for NAS signaling and handling the security key management; lawful interception of signaling; and/or providing the control plane function for mobility between LTE and 2G/3G access networks. In another embodiment, this can enable supporting LoCation Services (LCS); requesting routing information from the HSS; sending positioning requests to the Visited Mobile Switching Centre (VMSC) or SGSN Support Node) or MSC (Mobile Switching Centre) Server; and/or receiving final location estimates from the corresponding entity.

In step 1810, the HSS relay agent 510 can be utilized for routing messages to and from the bootstrapping function. In one embodiment, this can enable application independent functions for mutual authentication of user equipment and servers unknown to each other; 'bootstrapping' the exchange of secret session keys afterwards; utilization of services that need authentication and secured communication such as Mobile TV and PKI; routing for the Generic Authentication Architecture (GAA); arranging security relation between the UE and Network Application Function (NAF); and/or building a security relation with a previously unknown device first and allowing installing security elements (keys) in the device and the BSF afterwards. In another embodiment, this can enable the BSF to be introduced by the NAF, after an unknown UE device is trying to get service access; the NAF referring the UE to the BSF; the UE and BSF mutually authenticating via 3GPP protocol AKA (Authentication and Key Agreement); the BSF sending related queries to the HSS; the UE and BSF agreeing on a session key to be used for encrypted data exchange with the NAF; the UE again connecting to the NAF; the NAF being able to obtain the session key as well as user specific data from the BSF; and/or data exchange commencing with the UE using the related session keys for encryption.

The network elements of HSS relay zone 110 and PCC zone 120 can function to provide communication sessions for users, including voice, video and/or data communications. In one embodiment, the network elements can function similarly to LTE and/or IMS systems, but with the message routing being under the control of the Diameter agents described herein for each of the zones.

In one embodiment, combined services for circuit-switched and packet-switched communications can be facilitated by network 500 including for IMS-compliant communication devices and Public Switched Telephone Network communication devices. For example, network 500 can utilize the P-CSCF, I-/S-CSCF and CNR for registration. Communication session initiation and subscriber service implementation can be provided via SIP INVITE message utilizing P-CSCF, S-CSCF and AS. In some instances the aforementioned communication process is symmetrical. It is further noted that the communications of network 500 can be adapted to support video conferencing and the end user devices can operate as wireline and/or wireless devices. In one embodiment, the communication device can be communicatively coupled to a cellular base station, a femtocell, a WiFi router, a DECT base unit, or another suitable wireless access unit to establish communications with network 500.

In one embodiment, network 500 can support communications associated with wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution, and so on. Other present and next generation wireless network technologies can also be supported by the exemplary embodiments described herein.

The network 500 can represent a single instance of zones of network elements or there can be many instances of the zones of network elements shown in FIG. 5. In one embodiment, all messages that are communicated within zones 110, 120, 130 of the network 500 are done so utilizing Diameter protocol. In another embodiment, the HSS relay agent 510 does not examine or otherwise process any non-routing information (e.g., non-routing AVPs) of a message while the PCC proxy agent 520 and the DEA can selectively examine (or otherwise process) and/or adjust some or all messages, including routing and non-routing AVP's.

The exemplary embodiments describe utilizing proxy, relay and/or translation agents for routing messages within the various zones of network 500. These examples are described with respect to operation utilizing the Diameter protocol. However, one or more embodiments can utilize other protocols in combination with or in place or the Diameter protocol, including utilizing a combination of the Diameter protocol and RADIUS protocol (or another protocol) for messages being provided within the network 500. The exemplary embodiments can also interchange which of the agents are utilized in which of the zones so that one or more of the relay, proxy and translation can be utilized in each of the zones in different configurations. In one embodiment, one or more of the zones can utilize a different protocol than one or more other zones, such as through use of a translation agent routing messages between the zones. For example, Diameter protocol can be used in the HSS relay zone 110 while RADIUS or another protocol can be used for certain interfaces in the PCC zone 120. One or more of the exemplary embodiments can also operate, in whole or in part, in conjunction with other packet-based signaling protocols, including Authentication, Authorization and Accounting (AAA) protocols, such as RADIUS protocol.

It should be understood that devices described in the exemplary embodiments can be in communication with each other via various wireless and/or wired methodologies. The methodologies can be links that are described as coupled, connected and so forth, which can include uni-directional and/or bi-directional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 19:
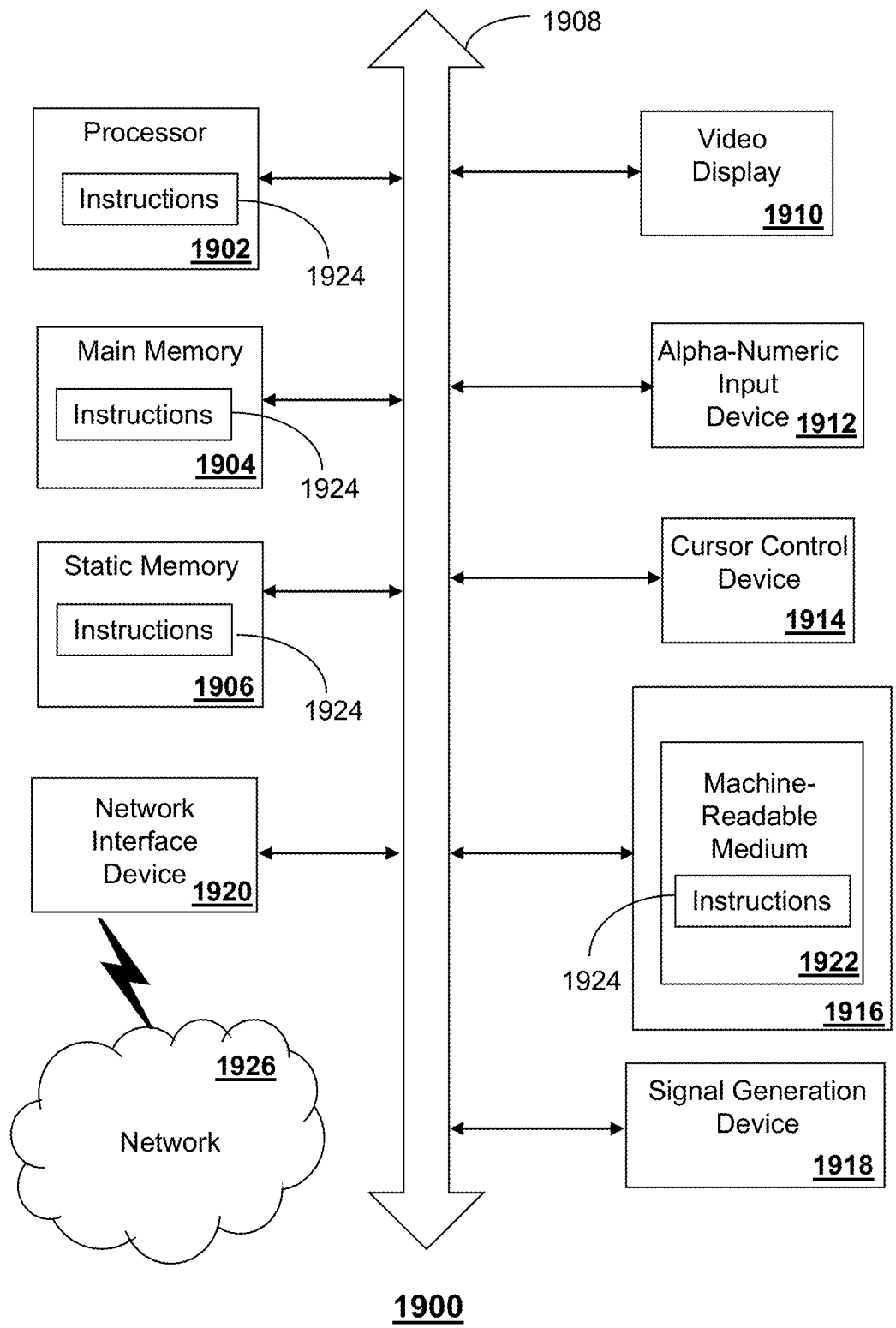
FIG. 19 is a diagrammatic representation of a machine in the form of a computer system within which a set of instructions, when executed, may cause the machine to perform any one or more of the methods discussed herein.

FIG. 19 depicts an exemplary diagrammatic representation of a machine in the form of a computer system 1900 within which a set of instructions, when executed, may cause the machine to perform any one or more of the methods discussed above. One or more instances of the machine can operate, for example, as the Diameter Agents and the network elements of networks 100, 500, and/or 1105 shown in FIGS. 1, 5 and 11 as described above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1900 may include a processor 1902 (e.g., a central processing unit (CPU), a graphics processing unit (GPU, or both), a main memory 1904 and a static memory 1906, which communicate with each other via a bus 1908. The computer system 1900 may further include a video display unit 1910 (e.g., a liquid crystal display (LCD), a flat panel, or a solid state display. The computer system 1900 may include an input device 1912 (e.g., a keyboard), a cursor control device 1914 (e.g., a mouse), a disk drive unit 1916, a signal generation device 1918 (e.g., a speaker or remote control) and a network interface device 1920.

The disk drive unit 1916 may include a non-transitory machine-readable medium 1922 on which is stored one or more sets of instructions (e.g., software 1924) embodying any one or more of the methods or functions described herein, including those methods illustrated above. The instructions 1924 may also reside, completely or at least partially, within the main memory 1904, the static memory 1906, and/or within the processor 1902 during execution thereof by the computer system 1900. The main memory 1904 and the processor 1902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1924, or that which receives and executes instructions 1924 from a propagated signal so that a device connected to a network environment 1926 can send or receive voice, video or data, and to communicate over a network 1926 using the instructions 1924. The instructions 1924 may further be transmitted or received over the network 1926 via the network interface device 1920.

While the machine-readable medium 1922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methods of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having similar functions or essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 1900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. The exemplary embodiments can include utilizing a combination of one or more features of different embodiments, including combining devices and/or method steps from two or more different embodiments.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
a processing system including a processor; and
a memory that stores executable instructions that, when executed by the processing system, facilitate performance of operations, comprising:
receiving messages utilizing a Diameter protocol from first network elements that provide subscriber management, wherein the messages are for a communication session, wherein the first network elements include a Mobile Management Entity server and a bootstrapping function server that are separate devices from each other and from the apparatus;

providing a policy and charging policy function zone to control policy functions on a per user basis, wherein the policy and charging policy function zone maintains a policy transaction state and a policy session state, wherein the apparatus is outside of the policy and charging policy function zone;

routing the messages utilizing the Diameter protocol directly to second network elements that provide the subscriber management, wherein the second network elements include a Home Subscriber Server, a Gateway Mobile Location Center, and a Serving GPRS Support Node that are separate devices from each other and from the apparatus, wherein the processor operating as a Home Subscriber Server relay function maintains a Home Subscriber Server transaction state during the communication session without maintaining a Home Subscriber Server session state, wherein the processor selectively adjusts routing attribute value pairs for the messages without adjusting non-routing attribute value pairs for the messages;

determining a subscriber location for the Home Subscriber Server; and providing one message of the messages to a Diameter edge agent function server that maintains transaction and session state during the communication session, wherein the Diameter edge agent function server routes the one message to an external network, wherein the Diameter edge agent function server is a separate device from the second network elements, and wherein the one message that is routed from the processor to the Diameter edge agent function server is translated from a Diameter protocol to another protocol by the Diameter edge agent function server, wherein the apparatus communicates directly with the Home Subscriber Server, wherein the apparatus communicates directly with the Mobile Management Entity server, wherein the apparatus communicates directly with the bootstrapping function server utilizing a first type of interface, wherein the apparatus communicates directly with the Gateway Mobile Location Center utilizing a second type of interface, wherein the apparatus communicates directly with the Serving GPRS Support Node utilizing a third type of interface, wherein the first, second and third types of interfaces are different, wherein the apparatus is a single server that performs the receiving of the messages, the maintaining of the Home Subscriber Server transaction state, the routing of the messages and the providing of the one of the messages, wherein the Home Subscriber Server routes the one message directly to the apparatus which is the single server, and wherein all messages transmitted from the processor to the external network are routed through the Diameter edge agent function server.

2. The apparatus of claim 1, wherein the providing of the one message to the Diameter edge agent function server is via an S6 interface.

3. The apparatus of claim 2, wherein the first type of interface is a Zh interface.

4. The apparatus of claim 1, wherein the subscriber management includes a Subscriber Location Function to determine the subscribe location.

5. The apparatus of claim 1, wherein all messages routed via the processor utilize a Diameter protocol, and wherein the one message that is routed from the processor to the Diameter edge agent function server is translated from the Diameter protocol to another protocol by the Diameter edge agent function server.

6. The apparatus of claim 1, wherein the third type of interface is an S6 interface.

7. The apparatus of claim 1, wherein the routing of the messages facilitates establishing communications utilizing an internet protocol multimedia subsystem network.

8. The apparatus of claim 1, wherein the first network elements include a Serving Call Session Control Function (S-CSCF) device, wherein the second network elements include an application server, and wherein routing by the processor of a registration message of the messages enables the S-CSCF device to register a first communication device with the application server to facilitate establishing communications between the first communication device and a second communication device.

9. The apparatus of claim 1, wherein the routing of the messages facilitates establishing communications utilizing an Evolved Packet System network or an internet protocol multimedia subsystem network.

10. The apparatus of claim 3, wherein all messages between the Mobile Management Entity server and the Gateway Mobile Location Center are routed through the single server.

11. A method comprising:

routing messages, by utilizing a first agent function of a processing system comprising a processor, between network elements that provide subscriber management for a communication session, wherein the network elements include a Home Subscriber Server and a policy and charging control function, and wherein the first agent function communicates directly with the Home Subscriber Server;

maintaining, by the first agent function operating as a Home Subscriber Server relay function, transaction state during the communication session without maintaining session state, wherein processing resources are not expended for non-routing information in the messages;

maintaining, by the policy and charging control function, a policy transaction state and a policy session state, wherein the policy and charging control function provides a proxy function and a translation function;

selectively adjusting, by the first agent function, routing information for the messages without adjusting non-routing information for the messages; and providing, by the first agent function, one message of the messages to a Diameter edge agent function server that maintains transaction and session state during the communication session, wherein the Diameter edge agent function server routes the one message to an external network, wherein the Diameter edge agent function server is a separate device from the network elements that provide the subscriber management, wherein the first agent function operates on a single server that performs the routing of the messages, the maintaining of the transaction state, the selectively adjusting of the routing information, and the providing of the one message, and wherein the Home Subscriber Server routes the one message directly to the first agent function operating on the single server, wherein the network elements include a Mobile Management Entity server, a bootstrapping function server, a Gateway Mobile Location Center, and a Serving GPRS Support Node, wherein the first agent function operating on the single server communicates directly with the Mobile Management Entity server, wherein the first agent function operating on the single server communicates directly with the bootstrapping function server, wherein the first agent function operating on the single server communicates directly with the Gateway Mobile Location Center, and wherein the first agent function operating on the single server communicates directly with the Serving GPRS Support Node.

12. The method of claim 11, wherein all messages transmitted from the first agent function to the external network are routed through the Diameter edge agent function server.

13. The method of claim 11, wherein all messages between the Mobile Management Entity server and the Gateway Mobile Location Center are routed through the single server utilizing an SLg interface.

14. The method of claim 11, wherein the subscriber management includes a Subscriber Location Function, wherein the first agent function operating on the single server communicates directly with the bootstrapping function server utilizing a first type of interface, wherein the first agent function operating on the single server communicates directly with the Gateway Mobile Location Center utilizing a second type of interface, wherein the first agent function operating on the single server communicates directly with the Serving GPRS Support Node utilizing a third type of interface, and wherein the first, second and third types of interfaces are different.

15. The method of claim 11, wherein the routing information comprises routing attribute value pairs, and wherein the non-routing information comprises non-routing attribute value pairs.

16. The method of claim 11, wherein the Diameter edge agent function server utilizes a translation agent for translating the one message between a Diameter protocol and another protocol before routing the one message to the external network, wherein the first agent function does not perform the translation and does not include the translation agent.

17. A non-transitory machine-readable storage medium, comprising executable instructions that, when executed by a processing system including a processor, facilitate performance of operations, comprising:

routing messages utilizing a Diameter protocol between network elements that provide subscriber management for a communication session, wherein the network elements include a Home Subscriber Server, and wherein the processor communicates directly with the Home Subscriber Server;

maintaining, by the processor operating as a Home Subscriber Server relay function, a Home Subscriber Server transaction state during the communication session without maintaining session state, wherein processing resources are not expended for non-routing information in the messages;

maintaining, by a policy and charging control function, a policy transaction state and a policy session state, wherein the policy and charging control function provides a proxy function and a translation function;

selectively adjusting routing information for the messages without adjusting non-routing information for the messages; and providing one of the messages to a Diameter edge agent function server that routes the one of the messages to an external network, wherein the Diameter edge agent function server is a separate device from the network elements that provide the subscriber management, wherein the processor is part of a single server that performs the routing of the messages, the maintaining of the Home Subscriber Server transaction state, the selectively adjusting of the routing information, and the providing of the one of the messages, wherein the network elements include a Mobile Management Entity server, a bootstrapping function server, a Gateway Mobile Location Center, and a Serving GPRS Support Node, wherein the processor operating on the single server communicates directly with the Mobile Management Entity server, wherein the processor operating on the single server communicates directly with the bootstrapping function server, wherein the processor operating on the single server communicates directly with the Gateway Mobile Location Center, and wherein the processor operating on the single server communicates directly with the Serving GPRS Support Node.

18. The non-transitory machine-readable storage medium of claim 17, wherein the Diameter edge agent function server maintains transaction and session state during the communication session for routing the message to the external network.

19. The non-transitory machine-readable storage medium of claim 17, wherein the Diameter edge agent function server utilizes a translation agent for translating the message between the Diameter protocol and another protocol before routing the message to the external network, wherein the processor does not perform the translation and does not include the translation agent.

20. The non-transitory machine-readable storage medium of claim 17, wherein the subscriber management includes a Subscriber Location Function, wherein all messages between the Mobile Management Entity server and the Gateway Mobile Location Center are routed through the single server, wherein the processor operating on the single server communicates directly with the bootstrapping function server utilizing a first type of interface, wherein the processor operating on the single server communicates directly with the Gateway Mobile Location Center utilizing a second type of interface, wherein the processor operating on the single server communicates directly with the Serving GPRS Support Node utilizing a third type of interface, and wherein the first, second and third types of interfaces are different.

* * * * *